United States Patent
Hsu et al.

(10) Patent No.: US 9,335,012 B2
(45) Date of Patent: May 10, 2016

(54) LIGHT BAR STRUCTURE AND LIGHT SOURCE DEVICE

(75) Inventors: Chih-Hua Hsu, New Taipei (TW);
Pin-Hung Hsu, New Taipei (TW);
Jung-Shiung Liau, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 512 days.

(21) Appl. No.: 13/452,939

(22) Filed: Apr. 23, 2012

(65) Prior Publication Data

US 2013/0021791 A1 Jan. 24, 2013

(30) Foreign Application Priority Data

Jul. 19, 2011 (TW) .............................. 100125430 A

(51) Int. Cl.
*F21S 4/00* (2006.01)
*F21V 19/00* (2006.01)
(Continued)

(52) U.S. Cl.
CPC .. *F21S 4/008* (2013.01); *F21S 4/20* (2016.01);
*F21S 4/28* (2016.01); *F21S 4/003* (2013.01);
*F21V 19/0025* (2013.01);
(Continued)

(58) Field of Classification Search
CPC ...... F21S 4/008; F21S 4/003; F21V 19/0025;
F21V 19/002; F21V 19/0015; F21V 19/0045;
F21V 19/0035; F21V 19/001; F21V 21/34;
F21V 21/35; F21V 21/005; F21V 21/025;
F21V 17/005; F21V 17/162; F21V 17/104;
F21V 19/004; F21V 19/02; F21K 9/175;
F21Y 2103/003; G02B 6/0085; G02F
1/133608

USPC .................... 362/225, 220, 221, 648, 249.02,
362/249.03, 249.07, 217.12, 217.13,
362/217.16, 612; 349/111, 115, 121
See application file for complete search history.

(56) References Cited

U.S. PATENT DOCUMENTS 4,999,755 A * 3/1991 Lin ........................... 362/217.02
6,435,697 B1 * 8/2002 Simmons et al. ............. 362/219
(Continued)

FOREIGN PATENT DOCUMENTS

TW      M315299      7/2007
TW      200821494      5/2008
TW      200821494 A      5/2008

OTHER PUBLICATIONS

Chen Gui-Fang, LED lighting device, May 16, 2008, TW200821494 (A), English translation.*

(Continued)

*Primary Examiner* — Evan Dzierzynski
*Assistant Examiner* — James Endo
(74) *Attorney, Agent, or Firm* — Winston Hsu; Scott Margo

(57) ABSTRACT

A light bar structure is disclosed in the present invention. The light bar structure includes a housing whereinside an accommodating space is formed, and the accommodating space is for accommodating a light unit. The housing includes an engaging portion for engaging with the light unit to constrain a movement of the light unit at a first direction, and a contacting portion for contacting against the light unit to constrain a movement of the light unit at a second direction different from the first direction. The light bar structure further includes an isolating component disposed on a bottom inside the housing, and two conductive components disposed on the isolating component for electrically connecting two electrodes of the light unit.

18 Claims, 6 Drawing Sheets

(51) Int. Cl.
| | |
|---|---|
| *F21V 21/34* | (2006.01) |
| *F21V 21/35* | (2006.01) |
| *F21V 21/02* | (2006.01) |
| *F21V 21/005* | (2006.01) |
| *F21V 8/00* | (2006.01) |
| *F21V 19/02* | (2006.01) |
| *F21Y 101/02* | (2006.01) |
| *F21Y 103/00* | (2016.01) |

(52) U.S. Cl.
CPC ........ *F21V 19/0035* (2013.01); *F21V 19/0045* (2013.01); *F21V 19/02* (2013.01); *F21V 21/005* (2013.01); *F21V 21/025* (2013.01); *F21V 21/34* (2013.01); *F21V 21/35* (2013.01); *F21Y 2101/02* (2013.01); *F21Y 2103/003* (2013.01); *G02B 6/0085* (2013.01)

(56) References Cited

U.S. PATENT DOCUMENTS

| | | | | |
|---|---|---|---|---|
| 7,394,658 | B2* | 7/2008 | McPhee | 361/710 |
| 7,997,770 | B1* | 8/2011 | Meurer | 362/311.02 |
| 2004/0233672 | A1* | 11/2004 | Dubuc | 362/294 |
| 2005/0157500 | A1* | 7/2005 | Chen et al. | 362/294 |
| 2006/0146502 | A1* | 7/2006 | Mayer | 361/720 |
| 2007/0098334 | A1* | 5/2007 | Chen | 385/92 |
| 2007/0285949 | A1* | 12/2007 | Lodhie et al. | 362/648 |
| 2008/0106892 | A1* | 5/2008 | Griffiths et al. | 362/223 |
| 2008/0130275 | A1* | 6/2008 | Higley et al. | 362/184 |
| 2009/0107699 | A1* | 4/2009 | Ryu | 174/250 |
| 2009/0244909 | A1* | 10/2009 | Chen | 362/368 |
| 2010/0214770 | A1* | 8/2010 | Anderson | 362/133 |
| 2010/0277914 | A1* | 11/2010 | Bachl et al. | 362/249.01 |
| 2011/0163341 | A1* | 7/2011 | Van Elmpt et al. | 257/98 |
| 2011/0176308 | A1* | 7/2011 | Wu et al. | 362/247 |
| 2011/0242811 | A1* | 10/2011 | Cheng | 362/249.03 |
| 2011/0249469 | A1* | 10/2011 | Lee et al. | 362/612 |
| 2011/0267805 | A1* | 11/2011 | Hua et al. | 362/101 |
| 2012/0002427 | A1* | 1/2012 | Moon et al. | 362/382 |
| 2012/0075850 | A1* | 3/2012 | Chang | 362/235 |
| 2012/0106144 | A1* | 5/2012 | Chang | 362/218 |

OTHER PUBLICATIONS

Office action mailed on Mar. 25, 2014 for the China application No. 201110214692.6, p. 3 line 4-11 and line 15-20.

Office action mailed on Nov. 19, 2013 for the Taiwan application No. 100125430, filing date: Jul. 19, 2011, p. 2 line 1-16.

* cited by examiner

LIGHT BAR STRUCTURE AND LIGHT SOURCE DEVICE

This application claims priority to Taiwan Application Serial Number 100125430, filed Jul. 19, 2011, which is incorporated herein by reference in its entirety.

BACKGROUND OF THE INVENTION

1. Field of the Invention

The present invention relates to a light bar structure and a light source device, and more particularly, to a light bar structure and a light source device having low material cost and manufacturing cost without utilizing surface mount technology.

2. Description of the Prior Art

Surface mount technology (SMT) is utilized to fix the light emitting diode on the base in the conventional light bar structure. The conventional base can be made of aluminum material or copper material. Material cost and manufacturing cost of the aluminum base is expensive and has great heat dissipating efficiency, so that the aluminum base is usually applied for high power light emitting diode, such as panel with large dimensions or huge monitor. Cost of the copper base (FR4 plate) is cheaper than the aluminum base, and the copper base has normal heat dissipating efficiency, so the copper base is usually applied for low power light emitting diode. However, the light emitting diode has to be fixed on the aluminum base and the copper base by the surface mount technology, so that the conventional light bar structure has drawbacks of expensive manufacturing cost and complicated production process. Thus, design of a light bar structure having easy assembly and low cost is an important issue of the panel industry.

SUMMARY OF THE INVENTION

The present invention provides a light bar structure and a light source device having low material cost and manufacturing cost without utilizing surface mount technology for solving above drawbacks.

According to the claimed invention, a light bar structure includes a housing whereinside an accommodating space is formed, and the accommodating space is for accommodating a light unit. The housing includes an engaging portion for engaging with a surface of the light unit so as to constrain a movement of the light unit along a first direction, and a contacting portion for contacting against a side of the light unit so as to constrain a movement of the light unit along a second direction different from the first direction. The light bar structure further includes two conductive components disposed on a bottom inside the housing for respectively contacting two electrodes of the light unit.

According to the claimed invention, the first direction is substantially perpendicular to the second direction.

According to the claimed invention, the housing further includes a base for supporting the light unit, and a covering portion connected to the base. The accommodating space is formed between the base and the covering portion, and the engaging portion and the contacting portion are disposed on the covering portion.

According to the claimed invention, the base is a metal structure processed by surface anodizing treatment.

According to the claimed invention, the light bar structure further includes an isolating component disposed between the conductive component and the base of the housing. The isolating component is disposed on a surface of the base.

According to the claimed invention, the isolating component comprises a protruding portion for isolating the conductive component and the base of the housing.

According to the claimed invention, the isolating component is made of resiliently deformable material.

According to the claimed invention, the housing further includes a heat conductive portion disposed on a bottom of the accommodating space and connected to the base.

According to the claimed invention, the engaging portion and the contacting portion are integrated with the covering portion monolithically.

According to the claimed invention, the base is integrated with the covering portion monolithically, or the covering portion is connected to the base by a fixing component.

According to the claimed invention, a light source device is for transmitting beams to an optical plate. The light source device includes a light unit, and a light bar structure for fixing the light unit. The light bar structure includes a housing whereinside an accommodating space is formed, and the accommodating space is for accommodating a light unit. The housing includes an engaging portion for engaging with a surface of the light unit so as to constrain a movement of the light unit along a first direction, and a contacting portion for contacting against a side of the light unit so as to constrain a movement of the light unit along a second direction different from the first direction. The light bar structure further includes two conductive components disposed on a bottom inside the housing for respectively contacting two electrodes of the light unit.

The present invention does not utilize the conventional surface mount technology to fix the light unit on the light bar structure. The light bar structure and the light source device of the present invention has advantages of simple structure, easy assembly, low material cost and manufacturing cost. Heat dissipating efficiency and optical efficiency of the light emitting diode are not decreased with assembly of the light bar structure of the prevent invention, so that the present invention can be applied on the side-in backlight module and the direct-type backlight module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
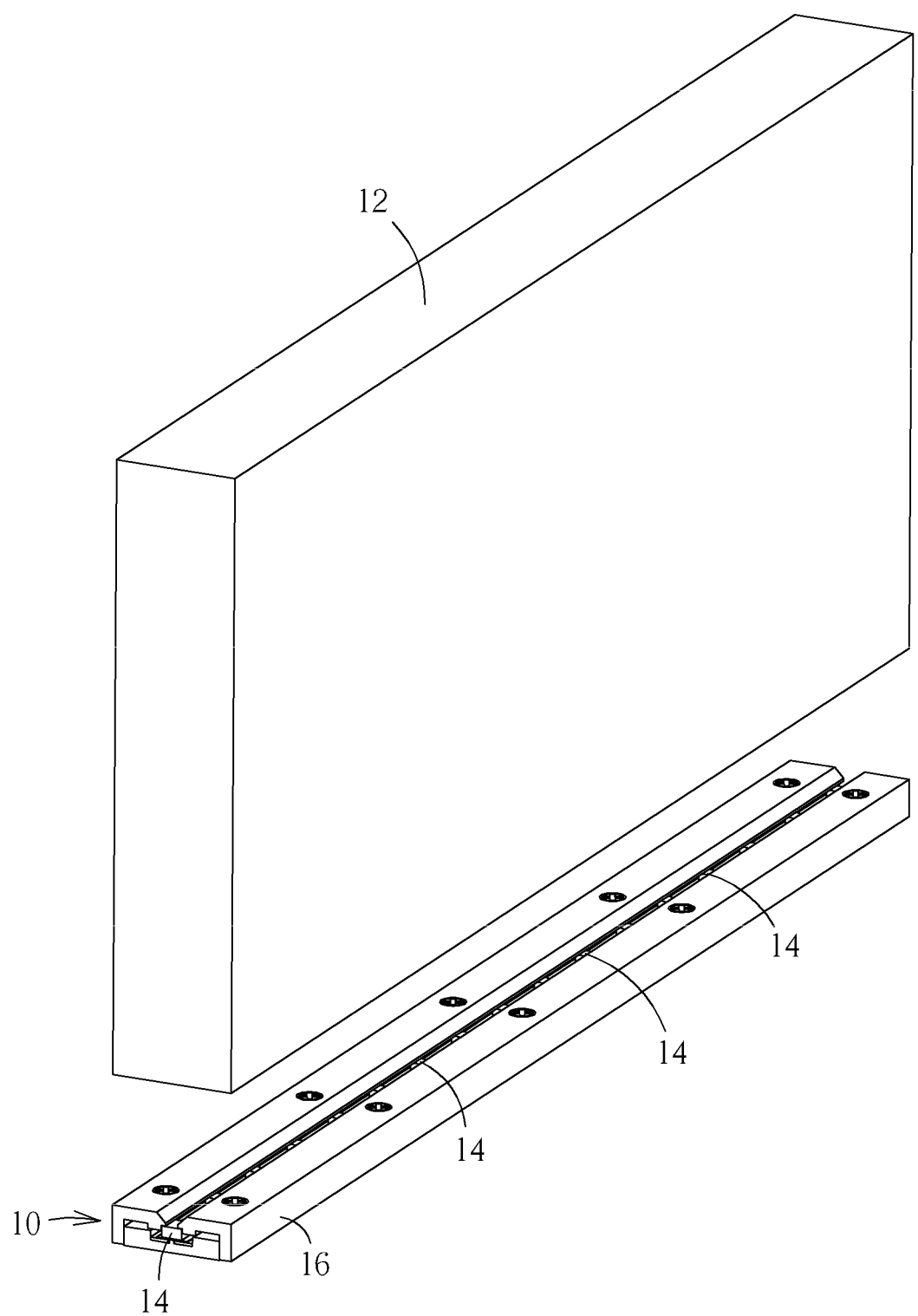
FIG. 1 and FIG. 2 are diagrams of a light source device in different applications according to an embodiment of the present invention.
Figure 2:
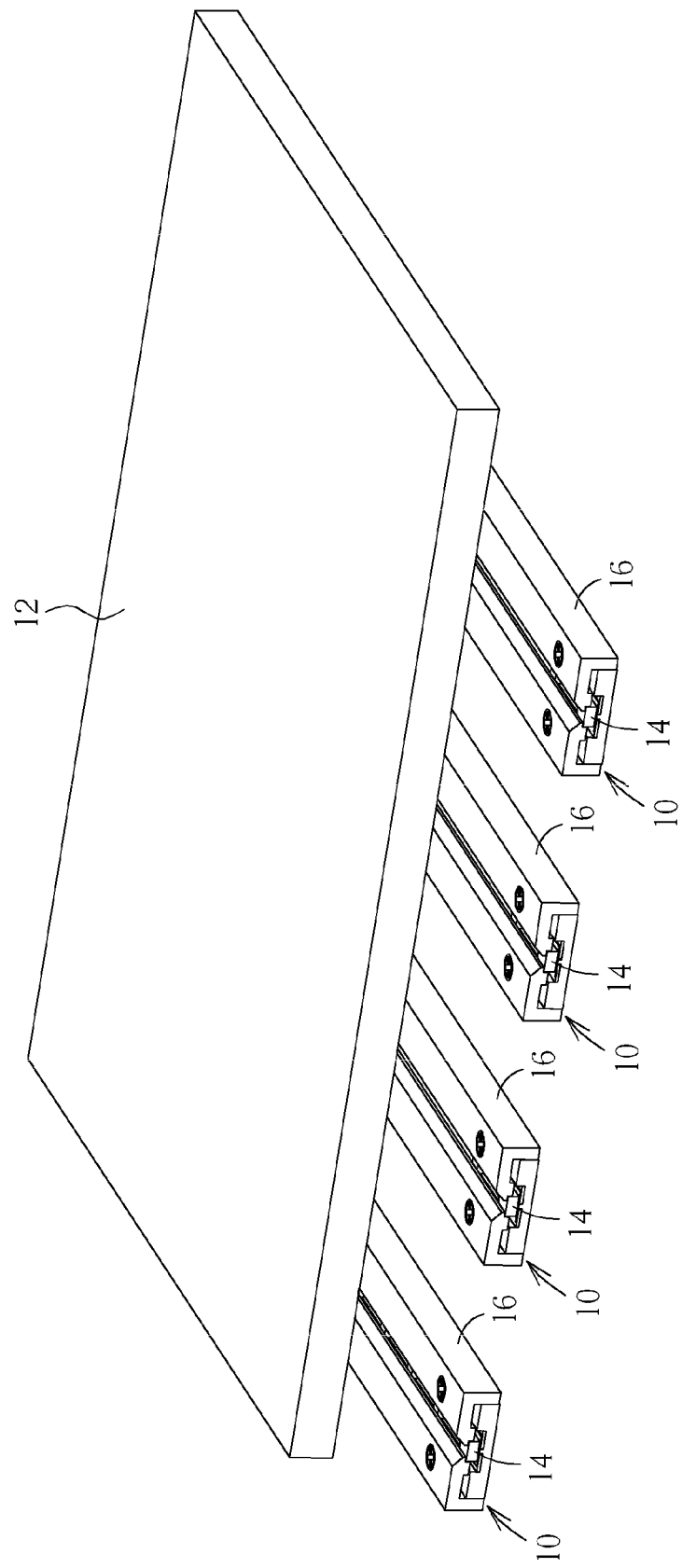

Please refer to FIG. 1 and FIG. 2. FIG. 1 and FIG. 2 are diagrams of a light source device 10 in different applications according to an embodiment of the present invention. The light source device 10 can be assembled with a corresponding optical plate 12 according to design demand for applying on a liquid crystal panel or a liquid crystal display. As shown in FIG. 1, the light source device 10 can be disposed by a side of the optical plate 12 (such as a light guiding plate) for forming a side-in backlight module. As shown in FIG. 2, the light source devices 10 can be arranged under the optical plate 12 (such as a diffusion plate) for forming a direct-type backlight module. The light source device 10 includes a plurality of light units 14 and a light bar structure 16. The light unit 14 can be a light emitting diode, and the light bar structure 16 is for fixing the plurality of LEDs, so as to transmit beams generated from the plurality of LEDs to the optical plate 12 for forming the back light module.

Figure 3:
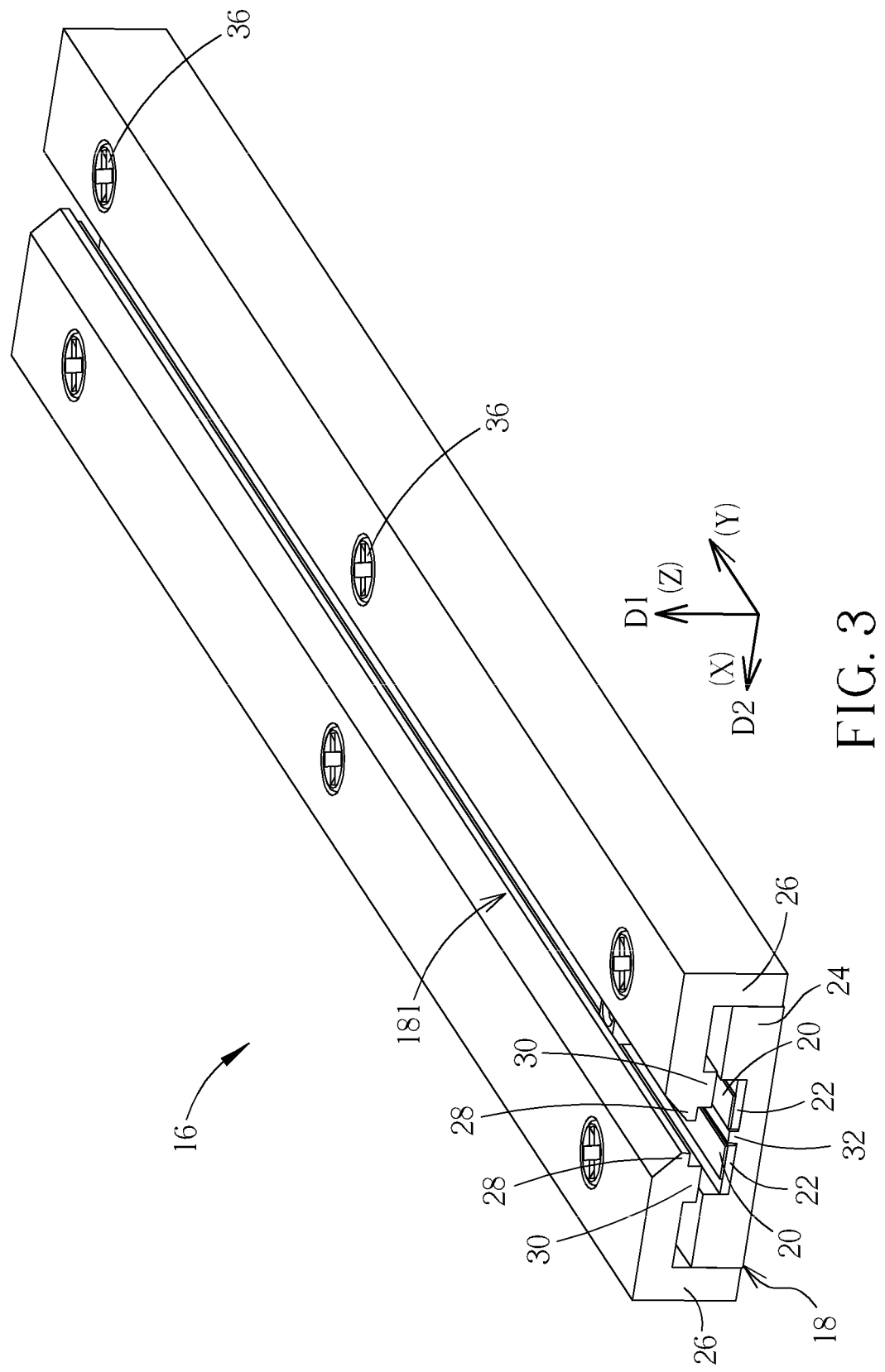
FIG. 3 is a diagram of a light bar structure according to a first embodiment of the present invention.
Figure 4:
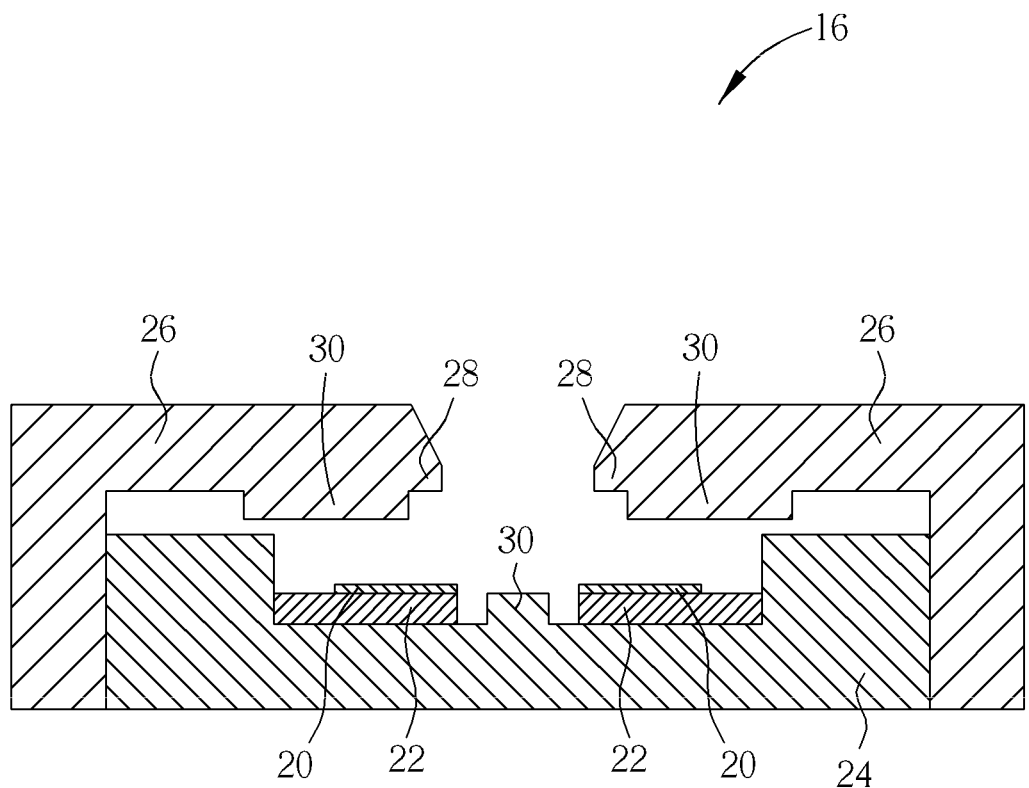
FIG. 4 is a sectional view of the light bar structure according to the first embodiment of the present invention.

Please refer to FIG. 3 and FIG. 4. FIG. 3 is a diagram of the light bar structure 16 according to a first embodiment of the present invention. FIG. 4 is a sectional view of the light bar structure 16 according to the first embodiment of the present invention. The light bar structure 16 includes a housing 18 and two conductive components 20. The conductive component 20 can be disposed on a bottom inside the housing 18 for contacting electrodes of each light unit 14, so that the plurality of light units 14 can be combined in a parallel connection. On the other hand, the light bar structure 16 can further include two isolating components 22 respectively disposed between the housing 18 and the corresponding conductive component 20 for decreasing material processing procedure and increasing communication stability of the light units 14. Because the housing 18 and the conductive component 20 can be isolated by the isolating component 22, the housing 18 can be made of aluminum material without surface anodizing treatment, so that the first embodiment of the present invention has advantages of low manufacturing cost and preferable heat dissipating efficiency. In addition, the isolating component 22 can be made of resiliently deformable material, such as rubber, and the light unit 14 can tightly be engaged inside the housing 18 by a resilient recovering force of the isolating component 22 due to material deformation.

Furthermore, the housing 18 includes a base 24, two covering portions 26, two engaging portions 28, two contacting portions 30 and a heat conductive portion 32. The base 24 is for supporting the light unit 14, and the isolating component 22 can be disposed on a surface of the base 24 for isolating the base 24 and the conductive component 20. The two covering portions 26 are respectively connected to two ends of the base 24, and an accommodating space 181 can be formed between the covering portions 26 and the base 24 for accommodating the light unit 14. The engaging portion 28 and the contacting portion 30 are respectively disposed on an end of the covering portion 26 adjacent to the accommodating space 181. The two engaging portions 28 can be for engaging with an upper surface of the light unit 14 simultaneously, so as to constrain a movement of the light unit 14 along a first direction D1 (Z axis). The two contacting portions 30 are respectively for contacting against a left side and a right side of the light unit 14, so as to constrain a movement of the light unit 14 along a second direction D2 (X axis) different from the first direction D1. The two conductive components 20 can be isolated by the heat conductive portion 32. Generally, the first direction D1 is substantially perpendicular to the second direction D2, as shown in FIG. 3, the plurality of light units 14 can be pushed into the housing 18 along Y axis, and the engaging portion 28 and the contacting portion 30 of the housing 18 can be utilized to constrain the movement of each light unit 14 along the Z axis (the first direction D1) and the X axis (the second direction D2), so as to form the light source device 10.

As shown in FIG. 3, the base 24 and the covering portion 26 can be two independent elements selectively, or the base 24 can be connected to the covering portion 26 by a plurality of fixing components 36, such as screws or bolts, for easy and rapid assembly. The covering portion 26 can be made of metal material or nonconductive material alternatively, such as aluminum material or plastic material. The base 24 can be made of metal material processed by anodizing treatment, such as aluminum material processed by surface anodizing treatment. At this time, the conductive component 20 can be directly disposed on the bottom inside the housing 18, which means that the conductive component 20 can be disposed on the base 24, so as to electrically connect to the base 24 and to provide preferable heat dissipating efficiency by the base 24 made of metal material. On the other hand, the engaging portion 28 and the contacting portion 30 can be integrated with the covering portion 26 monolithically, and the covering portion 26 can be integrated with the base 24 monolithically. Due to structural feature of the housing 18 of the light bar structure 16 of the present invention, the housing 18 can be made monolithically by aluminum extrusion, which means the base 24, the covering portion 26, the engaging portion 28, the contacting portion 30 and the heat conductive portion 32 can be integrated monolithically, so as to decrease manufacturing cost effectively. Furthermore, the heat conductive portion 32 is located between the two conductive components 20 and disposed on the base 24 (the bottom of the accommodating space 181). A gap between each light unit 14 and the heat conductive portion 32 can be filled with thermal compound, so that heat generated by the light unit 14 can be transmitted to the housing 18 via the thermal compound for dissipation, so as to increase heat dissipating efficiency of the light bar structure 16 and to grow service life of the light unit 14.

Figure 5:
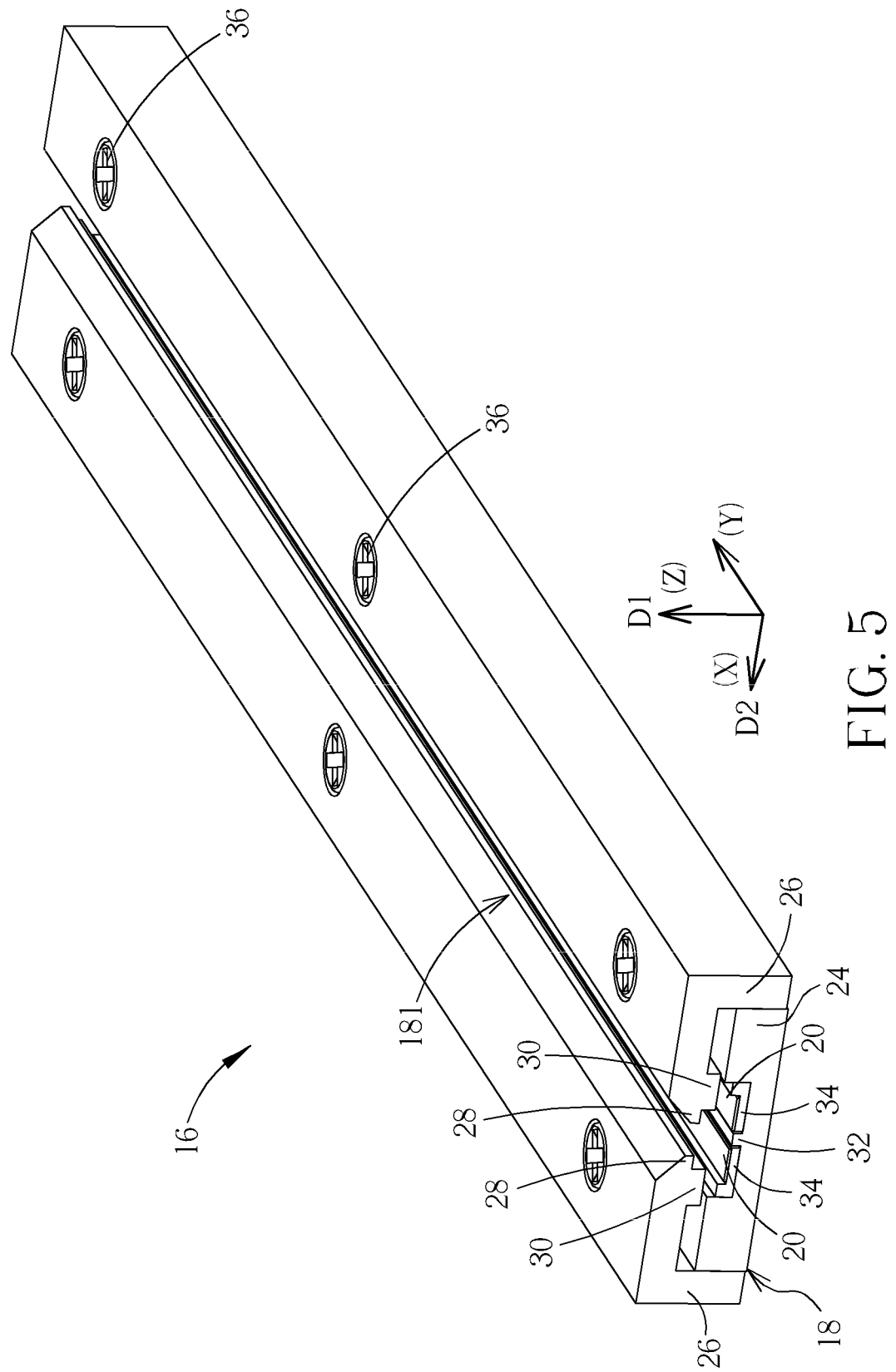
FIG. 5 is a diagram of the light bar structure according to a second embodiment of the present invention.
Figure 6:
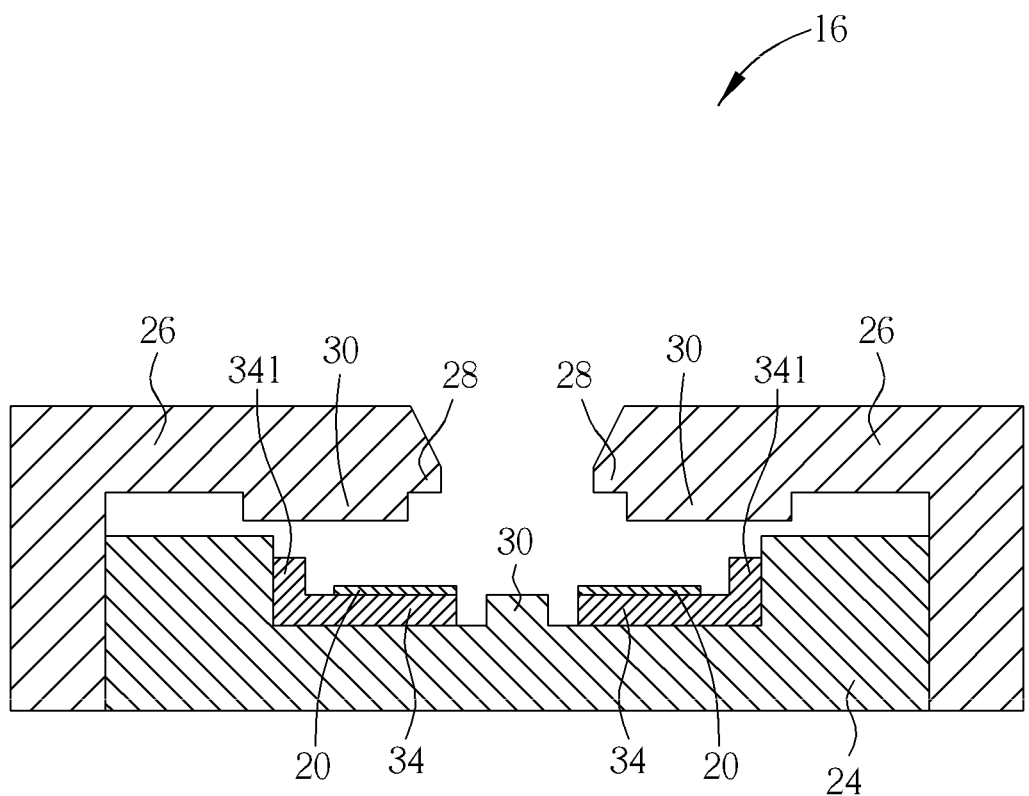
FIG. 6 is a sectional view of the light bar structure according to the second embodiment of the present invention.

Please refer to FIG. 5 and FIG. 6. FIG. 5 is a diagram of the light bar structure 16 according to a second embodiment of the present invention. FIG. 6 is a sectional view of the light bar structure 16 according to the second embodiment of the present invention. In the second embodiment, components having the same numerals as ones of the first embodiment have the same structures and functions, and detailed description is omitted herein for simplicity. Difference between the first embodiment and the second embodiment is that the isolating component 34 of the second embodiment can include a protruding portion 341 for preventing the conductive component 20 from contacting inner walls of the base 24, so as to cover the conductive component 20 completely. Because the conductive component 20 is disposed inside the accommodating space 181 of the housing 18, the isolating component 34 of the second embodiment can be a L-shaped structure for preventing the conductive component 20 and the housing 18 from short circuit when the conductive component 20 slides relative to the corresponding isolating component 22. The conductive component 20 and the housing 18 can be surely isolated by the L-shaped structure, so as to prevent the light source device 10 from short and damage.

In conclusion, the light bar structure and the light source device of the present invention can install the light unit inside the housing made by aluminum extrusion process. The housing made by the aluminum extrusion process can include the base, the covering portion, the engaging portion, the contacting portion and the heat conductive portion, which have functions of supporter, constrain and heat dissipation. Further, the base, the covering portion, the engaging portion, the contacting portion and the heat conductive portion can be integrated monolithically. Two conductive components can be disposed inside the housing for respectively contacting the positive electrode and the negative electrode of each light unit for forming the parallel connection. The isolating component of the light bar structure not only can be for isolating the conductive component and the housing, but also can apply the resilient recovering force on the bottom of each light unit due to resilient deformation for tightly engaging the light unit with the housing. In addition, shapes of the isolating component of the present invention can be designed according to disposition of the conductive component inside the accommodating space on the housing, such as a thin film or the L-shaped structure, for ensuring that the conductive component and the housing can be absolutely isolated.

Comparing to the prior art, the present invention does not utilize the conventional surface mount technology to fix the light unit on the light bar structure. The light bar structure and the light source device of the present invention has advantages of simple structure, easy assembly, low material cost and manufacturing cost. Heat dissipating efficiency and optical efficiency of the light emitting diode are not decreased with assembly of the light bar structure of the prevent invention, so that the present invention can be applied on the side-in backlight module and the direct-type backlight module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light bar structure comprising:
   a housing where inside an accommodating space is formed, the accommodating space being for accommodating a light unit, the housing comprising:
      a base for supporting the light unit;
      two covering portions respectively connected to opposite sides of the base, the accommodating space being formed between the base and the covering portion;
      two engaging portions respectively disposed on the corresponding covering portions for engaging with upper surfaces of two corners on a top side of the light unit so as to constrain a movement of the light unit along a first direction; and
      two contacting portions respectively disposed on the corresponding covering portions and connected to the corresponding engaging portions for laterally contacting against two lateral surfaces of the two corners of the light unit bent from the foresaid upper surfaces so as to constrain a movement of the light unit along a second direction different from the first direction and to prevent the light unit from contacting two opposite inner walls of the base, wherein an interval between the two opposite inner walls of the base is greater than an interval between the two contacting portions, and a shape of the accommodating space is substantially different from a shape of the light unit; and
   two conductive components disposed on a bottom inside of the housing for respectively contacting two electrodes disposed on a basal side of the light unit opposite to the top side.

2. The light bar structure of claim 1, wherein the first direction is substantially perpendicular to the second direction.

3. The light bar structure of claim 1, wherein the base is a metal structure processed by surface anodizing treatment.

4. The light bar structure of claim 1, wherein the light bar structure further comprises:
   an isolating component disposed between the conductive component and the base of the housing, wherein the isolating component is disposed on a surface of the base.

5. The light bar structure of claim 4, wherein the isolating component comprises a protruding portion for isolating the conductive component and the base of the housing.

6. The light bar structure of claim 4, wherein the isolating component is made of resiliently deformable material.

7. The light bar structure of claim 1, wherein the housing further comprises:
   a heat conductive portion disposed on a bottom of the accommodating space and connected to the base.

8. The light bar structure of claim 1, wherein the each engaging portion and the corresponding contacting portion are integrated with the covering portion monolithically.

9. The light bar structure of claim 1, wherein the base is integrated with the covering portions monolithically, or the covering portions are connected to the base by a fixing component.

10. A light source device for transmitting beams to an optical plate, the light source device comprising:
    a light unit; and
    a light bar structure for fixing the light unit, the light bar structure comprising:
       a housing where inside an accommodating space is formed, the accommodating space being for accommodating the light unit, the housing comprising:
          a base for supporting the light unit;
          two covering portions respectively connected to opposite sides of the base, the accommodating space being formed between the base and the covering portion;
          two engaging portions respectively disposed on the corresponding covering portions for engaging with upper surfaces of two corners on a top side of the light unit so as to constrain a movement of the light unit along a first direction; and
          two contacting portions respectively disposed on the corresponding covering portions and connected to the corresponding engaging portions for laterally contacting against two lateral surfaces of the two corners of the light unit bent from the foresaid upper surfaces so as to constrain a movement of the light unit along a second direction different from the first direction and to prevent the light unit from contacting two opposite inner walls of the base, wherein an interval between the two opposite inner walls of the base is greater than an interval between the two contacting portions, and a shape of the accommodating space is substantially different from a shape of the light unit; and
       two conductive components disposed on a bottom inside of the housing for respectively contacting two electrodes disposed on a basal side of the light unit opposite to the top side.

11. The light source device of claim 10, wherein the first direction is substantially perpendicular to the second direction.

12. The light source device of claim 10, wherein the base is a metal structure processed by surface anodizing treatment.

13. The light source device of claim 10, wherein the light bar structure further comprises:
    an isolating component disposed between the conductive component and the base of the housing, wherein the isolating component is disposed on a surface of the base.

14. The light source device of claim 13, wherein the isolating component comprises a protruding portion for isolating the conductive component and the base of the housing.

15. The light source device of claim 13, wherein the isolating component is made of resiliently deformable material.

16. The light source device of claim 10, wherein the housing further comprises:

a heat conductive portion disposed on a bottom of the accommodating space and connected to the base.

17. The light source device of claim 10, wherein the each engaging portion and the corresponding contacting portion are integrated with the covering portion monolithically.

18. The light source device of claim 10, wherein the base is integrated with the covering portion monolithically, or the covering portion is connected to the base by a fixing component.

* * * * *